(12) United States Patent
Saikusa et al.

(10) Patent No.: US 7,884,665 B2
(45) Date of Patent: Feb. 8, 2011

(54) CHARGE PUMP CIRCUIT, LCD DRIVER IC, AND ELECTRONIC APPLIANCE

(75) Inventors: Koji Saikusa, Kyoto (JP); Yasunori Kawamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 392 days.

(21) Appl. No.: 12/067,357

(22) PCT Filed: Dec. 1, 2006

(86) PCT No.: PCT/JP2006/324056
§ 371 (c)(1),
(2), (4) Date: Mar. 19, 2008

(87) PCT Pub. No.: WO2007/066587
PCT Pub. Date: Jun. 14, 2007

(65) Prior Publication Data
US 2010/0176872 A1     Jul. 15, 2010

(30) Foreign Application Priority Data

Dec. 8, 2005  (JP) ............... 2005-354689
Dec. 8, 2005  (JP) ............... 2005-354695
Dec. 8, 2005  (JP) ............... 2005-354708

(51) Int. Cl.
H02M 3/18    (2006.01)
G05F 3/02    (2006.01)

(52) U.S. Cl. .................. 327/536; 327/537; 363/60; 307/110

(58) Field of Classification Search .......... 327/536, 327/537; 363/59, 60; 307/110
See application file for complete search history.

(56) References Cited

U.S. PATENT DOCUMENTS

| | | | | |
|---|---|---|---|---|
| 4,636,930 A * | 1/1987 | Bingham et al. | ............... | 363/60 |
| 4,797,899 A * | 1/1989 | Fuller et al. | ............... | 375/219 |
| 4,812,961 A * | 3/1989 | Essaff et al. | ............... | 363/61 |
| 5,237,209 A * | 8/1993 | Brewer | ............... | 307/110 |
| 5,262,934 A * | 11/1993 | Price | ............... | 363/60 |
| 5,306,954 A * | 4/1994 | Chan et al. | ............... | 307/110 |
| 5,461,557 A | 10/1995 | Tamagawa | | |
| 5,532,916 A | 7/1996 | Tamagawa | | |
| 5,606,491 A * | 2/1997 | Ellis | ............... | 363/60 |
| 5,623,222 A | 4/1997 | Tamagawa | | |
| 5,777,317 A | 7/1998 | Maki | | |
| 5,859,625 A * | 1/1999 | Hartung et al. | ............... | 345/95 |
| 6,069,518 A | 5/2000 | Nakai et al. | | |
| 6,198,342 B1 | 3/2001 | Kawai | | |
| 6,853,566 B2 | 2/2005 | Itoh | | |
| 6,906,577 B2 * | 6/2005 | Kim | ............... | 327/536 |
| 6,919,746 B2 | 7/2005 | Suzuki | | |
| 7,050,315 B2 | 5/2006 | Itoh | | |

(Continued)

FOREIGN PATENT DOCUMENTS

JP     06-165482     6/1994

(Continued)

Primary Examiner—Lincoln Donovan
Assistant Examiner—Patrick O'Neill
(74) Attorney, Agent, or Firm—Fish & Richardson P.C.

(57) ABSTRACT

A charge pump circuit generates a desired output voltage by stepping up an input voltage. An LCD driver IC and an electronic appliance are provided with the charge pump circuit.

3 Claims, 6 Drawing Sheets

U.S. PATENT DOCUMENTS

| | | | |
|---|---|---|---|
| 7,099,166 B2 * | 8/2006 | Kim | 363/60 |
| 7,282,985 B2 * | 10/2007 | Yen et al. | 327/536 |
| 2004/0004851 A1 | 1/2004 | Itoh | |
| 2004/0130364 A1 | 7/2004 | Suzuki | |
| 2005/0169021 A1 | 8/2005 | Itoh | |
| 2006/0176718 A1 | 8/2006 | Itoh | |

FOREIGN PATENT DOCUMENTS

| | | |
|---|---|---|
| JP | 06-216323 | 8/1994 |
| JP | 07-231647 | 8/1995 |
| JP | 07-322606 | 12/1995 |
| JP | 2000-173288 | 6/2000 |
| JP | 2002-291233 | 10/2002 |
| JP | 2003-348821 | 12/2003 |
| JP | 2004-208142 | 7/2004 |
| JP | 2005-312169 | 11/2005 |

* cited by examiner

FIG. 7A  POSITIVE STEP UP (BY A FACTOR OF 2)

PRIOR ART

FIG. 7B  NEGATIVE STEP UP (BY A FACTOR OF 1)

PRIOR ART

CHARGE PUMP CIRCUIT, LCD DRIVER IC, AND ELECTRONIC APPLIANCE

TECHNICAL FIELD

The present invention relates to a charge pump circuit that generates a desired output voltage by stepping up an input voltage, and also relates to an LCD driver IC and an electronic appliance provided with such a charge pump circuit.

BACKGROUND ART

Figure 7A:
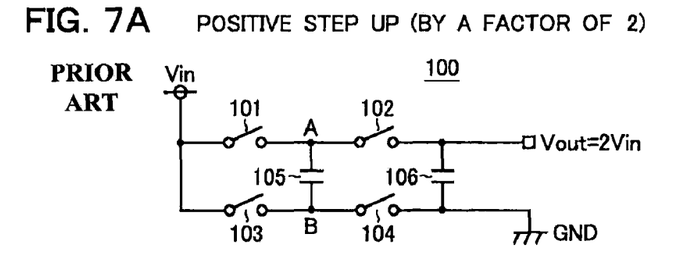
FIG. 7A A circuit diagram showing a conventional example of a charge pump circuit.
Figure 7B:
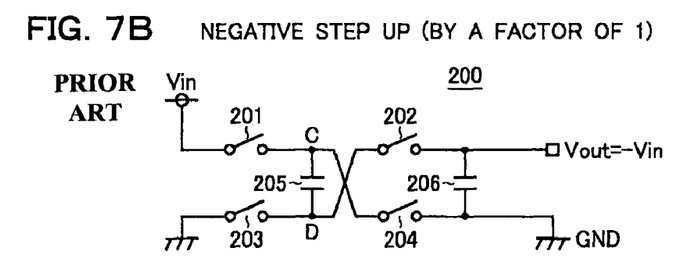
FIG. 7B A circuit diagram showing another conventional example of a charge pump circuit.

FIGS. 7A and 7B are circuit diagrams each showing an example of a conventional charge pump circuit. FIG. 7A shows a positive step-up (by a factor of 2) charge pump circuit, and FIG. 7B shows a negative step-up (by a factor of −1) charge pump circuit.

The charge pump circuits 100 and 200 shown in FIGS. 7A and 7B are so configured as to generate a desired output voltage Vout from an input voltage Vin by turning on or off the switches 101 to 104 and the switches 201 to 204 in cycles with predetermined timing.

A more specific description will now be given of the positive step-up operation by the charge pump circuit 100.

First, when the switches 101 and 104 are turned on and the switches 102 and 103 are turned off, an input voltage Vin is applied to one end (point A) of a first capacitor 105, and a ground voltage GND is applied to the other other end (point B) of the first capacitor 105. Thus, the first capacitor 105 is charged until the potential difference across the first capacitor 105 substantially reaches the level of the input voltage Vin.

When the charging of the first capacitor 105 is completed, the transistors 101 and 104 are turned off and the switches 102 and 103 are turned on. By this switching, the potential at point B is increased from the level of the ground voltage GND to the level of the input voltage Vin. Here, since a potential difference equal to the input voltage Vin has been applied across the first capacitor 105 through the charging described above, as the potential at point B is stepped up to the level of the input voltage Vin, the potential at point A is stepped up to the level of 2Vin (the input voltage Vin+the charged voltage Vin).

Meanwhile, since point A is connected to a ground terminal via the switch 102 and a second capacitor 106, the second capacitor 106 is charged until the potential difference across the second capacitor 106 substantially reaches the level of 2Vin. As a result, a positive stepped-up voltage 2Vin obtained by positively stepping up the input voltage Vin by a factor of 2 is derived as the output voltage Vout.

Next, a more specific description will be given of the negative step-up operation by the charge pump circuit 200.

First, when the switches 201 and 203 are turned on and the switches 202 and 204 are turned off, the input voltage Vin is applied to one end (point C) of the first capacitor 205 and the ground voltage GND is applied to the other end (point D) of the first capacitor 205. Thus, the first capacitor 205 is charged until the potential difference across the first capacitor 205 is charged until the potential difference across the first capacitor 205 substantially reaches the level of the input voltage Vin.

When the charging of the first capacitor 205 is completed, the transistors 201 and 203 are turned off and the switches 202 and 204 are turned on. By this switching, the potential at point C is reduced from the level of the input voltage Vin to the level of the ground voltage GND. Here, since a potential difference equal to the input voltage Vin has been applied across the first capacitor 205 through the charging described above, as the potential at point C is reduced to the level of the ground voltage GND, the potential at point D is also reduced to −Vin (the ground voltage GND minus the charge voltage Vin).

Meanwhile, since point D remains conducting to the output terminal via the switch 202, the electric charge in the second capacitor 206 moves to the first capacitor 205. As a result, a negatively stepped-up voltage −Vin obtained by negatively stepping up the input voltage Vin by a factor of 1 is derived as the output voltage Vout.

Conventionally, many application devices whose driving needs both a positive and a negative internal voltages (for example, liquid crystal display drivers and flash memories) are provided with both a positive and a negative step-up charge pump circuit as described above as means for generating positive and negative internal voltages (see, for example, Patent Publication 1).

As conventional arts related to the present invention, various disclosures and proposals have been made as exemplified by: a semiconductor integrated circuit device in which latchup of a parasitic transistor is prevented (see Patent Publication 2); and a charge pump circuit in which an auxiliary capacitor is connected between the backgate of a transistor constituting a pump cell and the input node, for the purpose of preventing latchup and charge leakage as well as eliminating a lowering of pump efficiency caused by the backgate effect (see Patent Publication 3).

In addition, various disclosures and suggestions have been made related to technologies for improving the start-up characteristic of a charge pump circuit in, for example, Patent Publications 4 and 5.

Patent Publication 1: JP-A-H07-231647
Patent Publication 2: JP-A-H06-216323
Patent Publication 3: JP-A-2000-173288
Patent Publication 4: JP-A-2004-208142
Patent Publication 5: JP-A-H07-322606

DISCLOSURE OF THE INVENTION

Problems to be Solved by the Invention

Surely, the conventionally configured charge pump circuits 100 and 200 described above are capable of generating the desired output voltage Vout (having a level of 2Vin or −Vin) by positively or negatively stepping up the input voltage Vin.

However, the above described conventionally configured charge pump circuits 100 and 200 are capable of generating only either a positive or a negative stepped-up voltage. Therefore, when both positive and negative stepped-up voltages are needed, both a positive and a negative step-up charge pump circuit need to be provided as in the conventional technology disclosed in Patent Publication 1. Disadvantageously, this not only requires an increased number of externally fitted capacitors, making it difficult to reduce the device scale, but also invites higher cost.

Also, in the conventionally configured negative step-up charge pump circuit 200 described above, when field effect transistors are used as the switches 201 to 204, the parasitic diode in a transistor to which a negative voltage is applied may operate erroneously, making it impossible to sufficiently lower the back gate voltage (substrate voltage) of each transistor, and thus making it impossible to generate the desired output voltage Vout.

Also, in the conventionally configured charge pump circuits 100 and 200 described above, their start-up characteristic (start-up time) is determined by appropriately adjusting the current supplying capabilities of the field effect transistors used as the switches 101 to 104 and the switches 201 to 204. Therefore, the user is not allowed to adjust the start-up characteristic as he/she desires.

A first object of the present invention is to provide a charge pump circuit capable of generating both a positive and a negative stepped-up voltage without inviting an increase in device scale, and to provide an LCD driver IC and an electronic appliance provided with such a charge pump circuit.

A second object of the present invention is to provide a charge pump circuit of which the start-up characteristic can be adjusted by the user as he/she desires, and to provide an LCD driver IC and an electronic appliance provided with such a charge pump circuit.

A third object of the present invention is to provide a charge pump circuit capable of generating an output voltage negatively stepped up to a desired level without fail, and to provide an LCD driver IC and an electronic appliance provided with such a charge pump circuit.

Means for Solving the Problem

To achieve the first object described above, a charge pump circuit of the present invention includes: a step-up capacitor charged and discharged in repeated cycles; a charger that, when charging the step-up capacitor, makes a first end of the step-up capacitor conduct to an input voltage application terminal and makes a second end of the step-up capacitor conduct to a ground terminal; a first discharger that, when a positive voltage is outputted, makes the first end of the step-up capacitor conduct to a positive voltage output terminal and makes the second end of the step-up capacitor conduct to the input voltage application terminal; a second discharger that, when a negative voltage is outputted, makes the first end of the step-up capacitor conduct to the ground terminal and makes the second end of the step-up capacitor conduct to a negative voltage output terminal; a first output capacitor connected to the positive voltage output terminal; and a second output capacitor connected to the negative voltage output terminal. Here, each time charging of the step-up capacitor is completed, outputting of a positive voltage by the first discharger and outputting of a negative voltage by the second discharger are alternated (first configuration).

To achieve the second object described above, a charge pump circuit of the present invention includes: a step-up capacitor charged and discharged in repeated cycles; a charger that, when charging the step-up capacitor, makes a first end of the step-up capacitor conduct to an input voltage application terminal and makes a second end of the step-up capacitor conduct to a ground terminal; a discharger that, when a positive voltage is outputted, makes the first end of the step-up capacitor conduct to a positive voltage output terminal and makes the second end of the step-up capacitor conduct to the input voltage application terminal; and an output capacitor connected to the positive voltage output terminal, the charge pump circuit outputting a positive voltage from the positive voltage output terminal. Here, the charge pump circuit includes a controller for variably controlling, according to a predetermined control signal, a ratio of a charge period of the step-up capacitor to an output period of the positive voltage (second configuration).

Also, to achieve the second object described above, a charge pump circuit of the present invention includes: a step-up capacitor charged and discharged in repeated cycles; a charger that, when charging the step-up capacitor, makes a first end of the step-up capacitor conduct to an input voltage application terminal and makes a second end of the step-up capacitor conduct to a ground terminal; a discharger that, when a negative voltage is outputted, makes the first end of the step-up capacitor conduct to the ground terminal and makes the second end of the step-up capacitor conduct to a negative voltage output terminal; and an output capacitor connected to the negative voltage output terminal, the charge pump circuit outputting a negative voltage from the negative voltage output terminal. Here, the charge pump circuit includes a controller for variably controlling, according to a predetermined control signal, a ratio of a charge period of the step-up capacitor to an output period of the negative voltage (third configuration).

To achieve the third object described above, a charge pump circuit of the present invention includes: a step-up capacitor charged and discharged in repeated cycles; a charger that, when charging the step-up capacitor, makes a first end of the step-up capacitor conduct to an input voltage application terminal and makes a second end of the step-up capacitor conduct to a ground terminal; a discharger that, when a negative voltage is outputted, makes the first end of the step-up capacitor conduct to the ground terminal and makes the second end of the step-up capacitor conduct to a negative voltage output terminal; and an output capacitor connected to the negative voltage output terminal, the charge pump circuit outputting a negative voltage from the negative voltage output terminal. Here, the charge pump circuit includes, as a component of the charger, a field effect transistor connecting and disconnecting a connection line between the second end of the step-up capacitor and the ground terminal; between a backgate of the field effect transistor and the ground terminal, a first switch is connected that connects the connection line when the step-up capacitor is charged, and disconnects the connection line otherwise (fourth configuration).

It is preferable that, to one of a source terminal and a drain terminal of the field effect transistor that is located on the step-up capacitor side, a second switch be connected that disconnects a connection line leading to that one terminal when a negative voltage is outputted from the negative voltage output terminal and that connects the connection line to that one terminal otherwise (fifth configuration).

An LCD driver IC that controls driving of a liquid crystal display includes the charge pump circuit having any one of the first to fifth configurations as a drive voltage generator for generating a drive voltage for the liquid crystal display (sixth configuration).

An electronic appliance includes a liquid crystal display as an appliance display and an LCD driver IC that controls driving of the liquid crystal display. Here, the LCD driver IC is an LCD driver IC having the sixth configuration described above (seventh configuration).

ADVANTAGES OF THE INVENTION

A charge pump circuit having the first configuration described above is capable of generating both a positive and a negative stepped up voltage without inviting an increase in device scale, and thus, contributes to making an LCD driver IC and an electronic appliance provided with the charge pump circuit compact, light, and slim.

A charge pump circuit having the second or the third configuration described above allows the user to adjust the start-up characteristic of the charge pump circuit as he/she desires.

A charge pump circuit having the fourth or the fifth configuration described above is capable of outputting an output voltage negatively stepped up securely to a desired level, and this makes it possible to drive an LCD driver IC or an electronic appliance provided with the charge pump circuit without any trouble.

BRIEF DESCRIPTION OF DRAWINGS

FIG. 2 A circuit diagram showing an example of the configuration of a charge pump circuit 31a.

FIG. 5A A sectional view showing the vertical structure of the charge pump circuit 31a.

FIG. 5B A sectional view showing the vertical structure of the charge pump circuit 31a.

LIST OF REFERENCE SYMBOLS

10 DC power source
30 TFT liquid crystal display (LCD)
30 LCD driver IC
31 DC/DC converter
31a positive/negative step-up charge pump circuit
32 gate control section
33 source control section
SW1a switch (P-channel field effect transistor)
SW1b switch (N-channel field effect transistor)
SW2a switch (P-channel field effect transistor)
SW2b switch (P-channel field effect transistor)
SW2c switch (N-channel field effect transistor)
SW3a switch (P-channel field effect transistor)
SW3b switch (N-channel field effect transistor)
SW4a switch (N-channel field effect transistor)
SW4b switch (N-channel field effect transistor)
SW5a switch (N-channel field effect transistor)
SW5b switch (N-channel field effect transistor)
Cc1 and Cc2 step-up capacitors
Co1 and Co2 output capacitors
T1a and T1b, T2a and T2b, T3, T4 external terminals

BEST MODE FOR CARRYING OUT THE INVENTION

The following description will discuss examples of how the present invention is applied to a DC/DC converter incorporated in an LCD (liquid crystal display) driver IC of a digital (still/video) camera for the purpose of converting a DC input voltage to generate drive voltages for driving a gate control section and a source control section.

Figure 1:
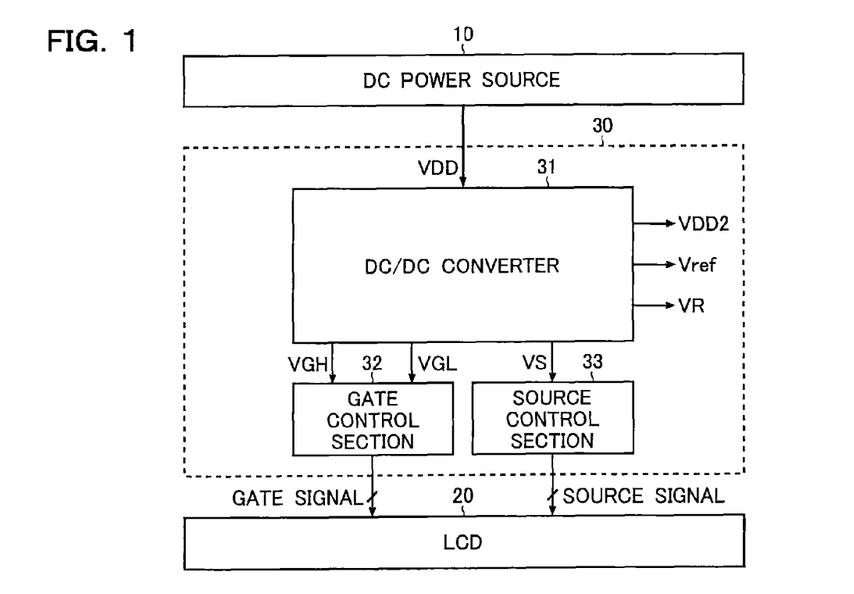
FIG. 1 A block diagram showing a digital camera embodying the present invention.

FIG. 1 is a block diagram showing a digital camera embodying the present invention (particularly, the power supply system for an LCD driver IC). As shown in the figure, the digital camera of this embodiment includes a DC power source 10 serving as an appliance power source, a TFT (thin film transistor) liquid crystal display 20 (hereinafter referred to as LCD 20) serving as an appliance display, and an LCD driver IC 30 that controls the driving of the LCD 20.

Needless to say, although not shown in the figure, in addition to the already mentioned components, the digital camera of this embodiment is further provided with, as means for realizing its essential functions (image sensing function, etc.), a CCD (charge coupled devices) type or a COMS (complementary metal oxide semiconductor) type image sensing device, an image formation portion such as an optical lens, an operation portion, a memory portion, etc.

The DC power source 10 supplies electric power to wherever it is needed in the appliance. The DC power source 10 may be a rechargeable battery such as a lithium-ion battery or an AC/DC converter that generates a DC voltage from a commercially delivered AC voltage.

The LCD 20 has a plurality of source signal lines and a plurality of gate signal lines laid in the vertical and horizontal directions, and has liquid crystal pixels arranged one at each of the intersections between the source signal lines and gate signal lines, each liquid crystal pixel driven as a corresponding active device (field effect transistor) is turned on and off.

The LCD driver IC 30 includes a DC/DC converter 31, a gate control section 32, and a source control section 33.

The DC/DC converter 31 converts a power source voltage VDD (+3 V) fed from the DC power source 10 into various internal voltages (VDD2, Vref, VR, VS, VGH, and VGL). The internal voltage VDD2 (+6 V) is obtained by stepping up the power source voltage VDD by a factor of 2, and the reference voltage Vref is a band gap compensation voltage independent of ambient temperature. The internal voltages VR and VS are constant voltages (+3.36 V, +5 V) generated based on the reference voltage Vref; the former is used as a standard voltage when the drive voltages VGH and VGL for the gate control section 32 are generated, and the latter is fed to the source control section 33 as the drive voltage VS for the source control section 33.

The gate control section 32 and the source control section 33 generate, based on an image signal fed from outside the IC, gate signals and source signals, respectively, for the LCD 30, and feed the signals to the LCD 30.

To generate the gate signals for the LCD 30, the gate control section 32 needs a positive drive voltage VGH (for example, +9 V) and a negative drive voltage VGL (for example, −6 V); accordingly, the DC/DC converter 31 of this embodiment includes, as means for generating the drive voltages VGH and VGL for the gate control section 32, a positive/negative step-up charge pump circuit, which can generate a positive and a negative output voltages VGH and VGL from a single input voltage VDD.

Figure 2:
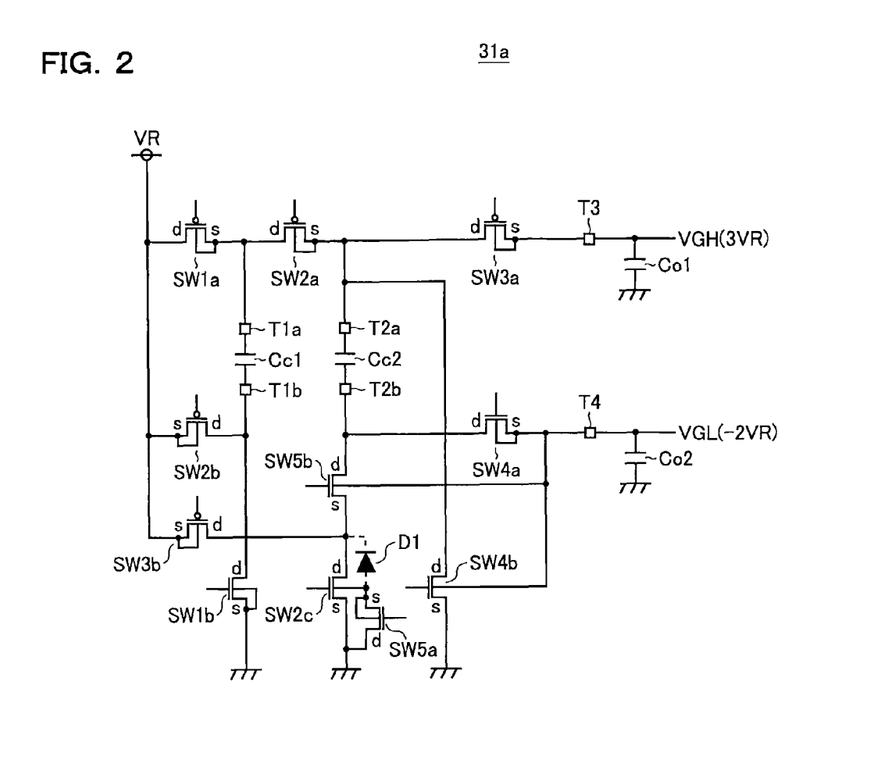

FIG. 2 is a circuit diagram showing an example of the configuration of a charge pump circuit 31a incorporated in the DC/DC converter 31.

As shown in the figure, the charge pump circuit 31a of this embodiment includes switches SW1a and SW1b, switches SW2a to SW2c, switches SW3a and SW3b, switches SW4a and SW4b, switches SW5a and SW5b, step-up capacitors Cc1 and Cc2, and output capacitors Co1 and Co2. The charge pump circuit 31a is so configured as to generate desired output voltages VGH and VGL from an internal voltage VR by switching each of the above mentioned switches periodically with predetermined timing.

In the charge pump circuit 31a of this embodiment, P-channel field effect transistors are used as the switch SW1a, the switches SW2a and SW2b, and the switches SW3a and SW3b, and N-channel field effect transistors are used as the switch SW1b, the switch SW2c, the switches SW4a and SW4b, and the switches SW5a and SW5b.

Accordingly, in the following description of the interconnection among individual circuit components with respect to the inner configuration of the charge pump circuit 31a, the switches SW1a to SW1c, the switches SW2a to SW2c, the switches SW3a and SW3b, the switches SW4a and SW4b, and the switches SW5a and SW5b will be referred to as the transistors SW1a to SW1c, the transistors SW2a to SW2c, the transistors SW3a and SW3b, the transistors SW4a and SW4b, and the transistors SW5a and SW5b, respectively.

The drain of the transistor SW1a is connected to an internal voltage VR application terminal. The source of the transistor SW1a is connected to an external terminal T1a. The backgate of the transistor SW1a is connected to the source of the transistor SW1a.

The drain of the transistor SW1b is connected to an external terminal T1b. The source of the transistor SW1b is grounded. The backgate of the transistor SW1b is connected to the source of the transistor SW1b.

The drain of the transistor SW2a is connected to the external terminal T1a. The source of the transistor SW2a is connected to the external terminal T2a. The backgate of the transistor SW2a is connected to the source of the transistor SW2a itself. The transistor SW2a is a high-withstand-voltage transistor.

The source of the transistor SW2b is connected to the internal voltage VR application terminal. The drain of the transistor SW2b is connected to the external terminal T1b. The backgate of the transistor SW2b is connected to the source of the transistor SW2b.

The drain of the transistor SW2c is connected to the drain of the transistor SW3b and to the source of the transistor SW5b. The source of the transistor SW2c is grounded. The backgate of the transistor SW2c is connected to the source of the transistor SW2c itself via the transistor SW5a.

The drain of the transistor SW3a is connected to the external terminal T2a. The source of the transistor SW3a is connected to an external terminal T3. The backgate of the transistor SW3a is connected to the source of the transistor SW3a itself. The transistor SW3a is a high withstand-voltage transistor.

The source of the transistor SW3b is connected to the internal voltage VR application terminal. The backgate of the transistor SW3b is connected to the source of the transistor SW3b.

The drain of the transistor SW4a is connected to the external terminal T2b. The source of the transistor SW4a is connected to the external terminal T4. The backgate of the transistor SW4a is connected to the source of the transistor SW4a itself. The transistor SW4a is a high withstand-voltage transistor.

The drain of the transistor SW4b is connected to the external terminal T2a. The source of the transistor SW4b is grounded. The backgate of the transistor SW4b is connected to the external terminal T4. The transistor SW4b is a high withstand-voltage transistor.

The source of the transistor SW5a is connected to the backgate of the transistor SW2c, and the drain of the transistor SW5a is connected to the source of the transistor SW2c. The backgate of the transistor SW5a is connected to the source of the transistor SW5a itself.

The drain of the transistor SW5b is connected to the external terminal T2b. The backgate of the transistor SW5b is connected to the external terminal T4. The transistor SW5b is a high withstand-voltage transistor.

Between the external terminal T1a and the external terminal T1b, a step-up capacitor Cc1 is externally connected.

Between the external terminal T2a and the external terminal T2b, a step-up capacitor Cc2 is externally connected.

The external terminal T3 serves as a positive stepped up voltage VGH output terminal. The external terminal T3 is grounded via an output capacitor Co1, and is also connected to the positive voltage application terminal (not shown) of the gate control section 32.

The external terminal T4 corresponds to a negative stepped up voltage VGL output terminal. The external terminal T4 is grounded via an output capacitor Co2, and is also connected to the negative voltage application terminal (not shown) of the gate control section 32.

The transistors described above are each accompanied by a parasitic diode. In particular, the transistor SW2c is accompanied by a parasitic diode D1 whose anode and cathode are the backgate and the source, respectively, of the transistor SW2c.

As is clear from the above description, the transistor SW1a serves as a switch that connects and disconnects the connection line between the internal voltage VR application terminal and a first end of the capacitor Cc1. The transistor SW1b serves as a switch that connects and disconnects the connection line between a second end of the capacitor Cc1 and a ground terminal.

The transistor SW2a serves as a switch that connects and disconnects the connection line between the first end of the capacitor Cc1 and a first end of the capacitor Cc2. The transistor SW2b serves as a switch that connects and disconnects the connection line between the second end of the capacitor Cc1 and the internal voltage VR application terminal. The transistor SW2c serves as a switch that connects and disconnects the connection line between a second end of the capacitor Cc2 and a ground terminal.

The transistor SW3a serves as a switch that connects and disconnects the connection line between the first end of the capacitor Cc2 and the external terminal T3 (the positive voltage output terminal). The transistor SW3b serves as a switch that connects and disconnects the connection line between the second end of the capacitor Cc2 and the internal voltage VR application terminal.

The transistor SW4a serves as a switch that connects and disconnects the connection line between the second end of the capacitor Cc2 and the external terminal T4 (the negative voltage output terminal). The transistor SW4b serves as a switch that connects and disconnects the connection line between the second end of the capacitor Cc2 and a ground terminal.

The transistor SW5a serves as a switch that connects and disconnects the connection line between the backgate and the source of the transistor 2c. The transistor SW5b serves as a switch that connects and disconnects the connection line between the drain of the transistor SW2c and the second end of the capacitor Cc2 and the connection line between the drain of the transistor SW2c and the drain of the transistor SW4a.

To the gates of the transistors SW1a and SW1b, the transistors SW2a to 2c, the transistors SW3a and SW3b, the transistors SW4a and SW4b, and the transistors SW5a and SW5b, gate control signals are fed individually, from an unshown control circuit.

A specific description will now be given, with reference to FIG. 3, of the positive/negative voltage output operations of the charge pump circuit 31a configured as described above.

Figure 3:
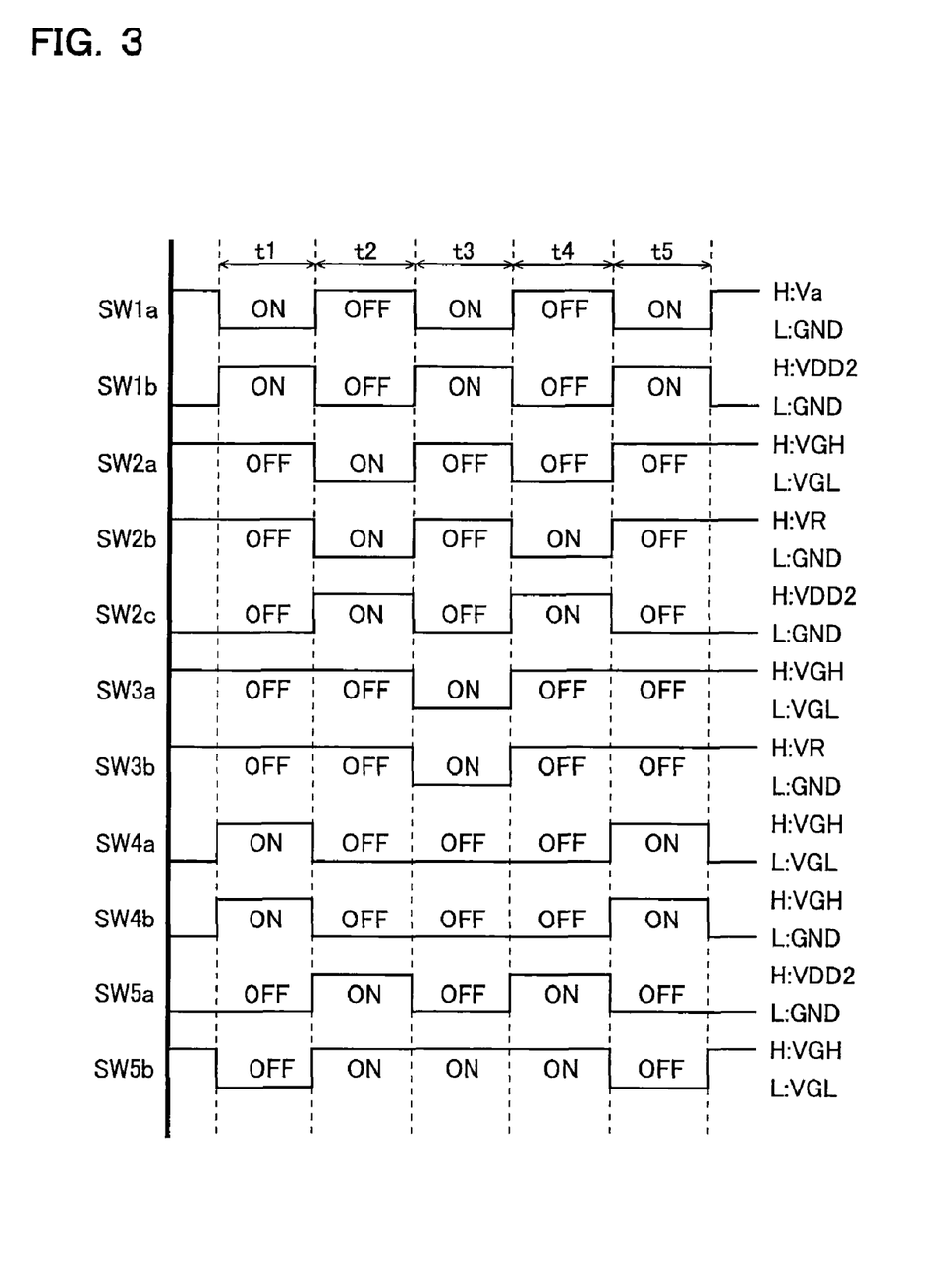
FIG. 3 A timing chart showing an example of the waveforms of the gate control signals fed to transistors.

FIG. 3 is a timing chart showing an example of the waveforms of the gate control signals (the signals for turning on/off the switches individually) fed to the individual transistors. The high and low level potentials of each gate signal are indicated at the right end of the figure.

After the charge pump circuit 31a is started up, first, during period t1, the switches SW1a and SW1b are kept on while the switches SW1a to SW2c are kept off. By this switching, the internal voltage VR is applied to the first end of the capacitor Cc1 (the external terminal T1a), and the ground voltage GND is applied to the second end of the capacitor Cc1 (the external terminal T1b). Thus, the capacitor Cc1 is charged until the potential difference across it substantially reaches the level of the internal voltage VR. In other words, period t1 corresponds to the charge period of the capacitor Cc1.

During period t1, the switches other than those mentioned above, namely, the switches SW3a and SW3b, the switches SW4a and SW4b, and the switches SW5a and SW5b are kept in the same on/off states that they are in when the negative output voltage VGL is outputted from the external terminal T4 (their respective on/off states shown in FIG. 3). However, immediately after the charge pump circuit 31a is started up, because no electric charge has been accumulated in the capacitor Cc2, no negative voltage VGL is outputted.

On completion of the charging of the capacitor Cc1, period t2 starts, during which the switches SW1a and SW1b are kept off while the switches SW2a to SW2c and the switches SW5a and SW5b are kept on. Meanwhile, the switches SW3a and SW3b and the switches SW4a and SW4b are kept off.

By this switching, the second end of the capacitor Cc1 (the external terminal T1b) is connected to the internal voltage VR application terminal via the switch SW2b, and the potential of the second end of the capacitor Cc1 is increased from the level of the ground voltage GND to the level of the internal voltage VR. Here, across the capacitor Cc1, a potential difference corresponding to the internal voltage VR is applied through the charging operation described above, and thus, when the potential of the external terminal T1b is increased to the level of the internal voltage VR, the potential of the external terminal T1a is also increased to the level of 2VR (the internal voltage VR plus the charged voltage VR). Meanwhile, since the external terminal T1a is connected to the ground terminal via the switch SW2a, the capacitor Cc1, the switch SW5b, and the switch SW2c, the capacitor Cc2 is charged until the potential difference across it substantially reaches the level of 2VR. In other words, period t2 corresponds to the charge period of the capacitor Cc2.

On completion of the charging of the capacitor Cc2, period t3 starts, during which the switches SW1a and SW1b are again kept on, and the switches SW2a to SW2c are kept off. By this switching, the capacitor Cc1 is charged, as in period t1 described above, until the potential difference across the capacitor Cc1 substantially reaches the level of the internal voltage VR.

During period t3, the switches SW3a and SW3b and the switch SW5b are kept on, while the switches SW4a and SW4b and the switch SW5a are kept off. By this switching, the second end of the capacitor Cc2 (the external terminal T2b) is connected to the internal voltage VR application terminal via the switch SW5b and the switch SW3b, and the potential of the second end of the capacitor Cc2 is increased from the level of the ground voltage GND to the level of the internal voltage VR. Here, across the capacitor Cc2, a potential difference 2VR has been applied by the charging described above, and thus, when the potential of the external terminal T2b is increased to the level of the internal voltage VR, the potential of the external terminal T2a is also increased to the level of 3VR (the internal voltage VR plus the charged voltage 2VR). Meanwhile, since the external terminal T2a is connected to a ground terminal via the switch SW3a and the capacitor Co1, the capacitor Co1 is charged until the potential difference across the capacitor Co1 substantially reaches the level of 3VR. As a result, from the external terminal T3, a positive stepped-up voltage 3VR obtained by positively stepping up the internal voltage VR by a factor of 3 is derived as the output voltage VGH.

In other words, period t3 corresponds to the output period of the output voltage VGH (a positive stepped up voltage 3VR) as well as to the charge period of the capacitor Cc1.

Period t3, throughout which the output voltage VGH is derived, is followed by period t4, during which the switches SW1a and SW1b are kept off while the switches SW2a to SW2c and the switches SW5a and SW5b are kept on, with the switches SW3a and SW3b and the switches SW4a and SW4b kept off. Thus, as in period t2 described above, the capacitor Cc2 is charged until the potential difference across the capacitor Cc2 substantially reaches the level of 2VR. Thus, period t4 corresponds to the charge period of the capacitor Cc2.

On completion of the charging of the capacitor Cc2, period t5 starts, during which the switches SW1a and SW1b are again kept on while the switches SW2a to SW2c are kept off. By this switching, the capacitor Cc1 is charged, like in period t1 described above, until the potential difference across the capacitor Cc1 substantially reaches the level of the internal voltage VR.

Furthermore, during period t5, the switches SW4a and SW4b are kept on while the switches SW3a and SW3b and the switches SW5a and SW5b are kept off. By this switching, the first end of the capacitor Cc2 (the external terminal T2a) is connected to the ground terminal via the switch SW4b, and the potential of the first end of the capacitor Cc2 is reduced to the level of the ground voltage GND. Here, across the capacitor Cc2, a potential difference corresponding to the internal voltage 2VR has been applied through the charging operation described above, and thus, when the potential of the external terminal T2a is reduced to the level of the ground voltage GND, the potential of the external terminal T2b is also reduced to the level of −2VR (the ground voltage GND minus the charged voltage 2VR). Meanwhile, since the external terminal T2b remains conducting to the external terminal T4 via the switch SW4a, the electric charge of the capacitor Co2 is transferred to the capacitor Cc2. As a result, from the external terminal T4, a negative stepped-up voltage −2VR obtained by negatively stepping up the internal voltage VR by a factor of 2 is derived as the output voltage VGH.

In other words, period t5 corresponds to an output period of the output voltage VGL (negative stepped up voltage −2VR) as well as to the charge period of the capacitor Cc1.

Thereafter, the switching described above is repeated so that each time the charging of the capacitor Cc2 is completed, the output periods of the output voltages VGH and VGL are alternately repeated; thus the positive output voltage VGH and the negative output voltage VGL are derived from the output terminals T3 and T4, respectively.

As hitherto described, the charge pump circuit 31a of this embodiment includes: a step-up capacitor whose charging and discharging are repeated cyclically (in a case where a plurality of step-up capacitors, like Cc1 and Cc2 in this embodiment, are used to step up a voltage in multiple stages, the final-stage step-up capacitor Cc2 in particular); a charger (switches SW2a and SW2b) that makes the first end of the step-up capacitor Cc2 (T2a) conduct to an internal voltage VR application terminal via a step-up capacitor Cc1 and makes the second end of the step-up capacitor Cc2 (T2b) conduct to a ground terminal when the step-up capacitor Cc2 is charged; a first discharger (switches SW3a and SW3b) that makes the first end of the step-up capacitor Cc2 (T2a) conduct to a positive voltage output terminal (T3) and makes the second end of the step-up capacitor Cc2 (T2b) conduct to the internal voltage VR application terminal when a positive output voltage VGH is outputted; a second discharger (switches SW4a and SW4b) that makes the first end of the step-up capacitor Cc2 (T2a) conduct to the ground terminal and makes the second end of the step-up capacitor Cc2 (T2b) conduct to a negative voltage output terminal T4 when a negative voltage VGL is outputted; a first output capacitor Co1 connected to the positive voltage output terminal T3; and a second output capacitor Co2 connected to the negative voltage output terminal T4. Here, each time the charging of the step-up capacitor Cc2 is completed, the output of the positive voltage VGH by the first discharger and the output of the negative voltage VGL by the second discharger are alternated.

With this configuration, as compared with one provided with both a positive and a negative step-up charge pump circuit, it is possible to generate both a positive output voltage VGH (3VR) and a negative output voltages VGL (−2VR) while minimizing an increase in device scale (an increase in the number of externally fitted capacitors), and thereby to contribute to making the LCD driver IC 30 and a digital camera provided with the charge pump circuit 31a compact, light, and slim.

Alternating the outputs of the positive and the negative voltages VGH and VGL, the charge pump circuit 31a of this embodiment produces a larger ripple than one configured to alternately generate output voltages of the same polarity does. However, since the positive and negative voltages VGH and VGL are used when gate signals are generated at the gate control section 32, even if a larger ripple appears, it is extremely unlikely to affect the logic levels (high level/low level) of the gate signals.

Figure 4:
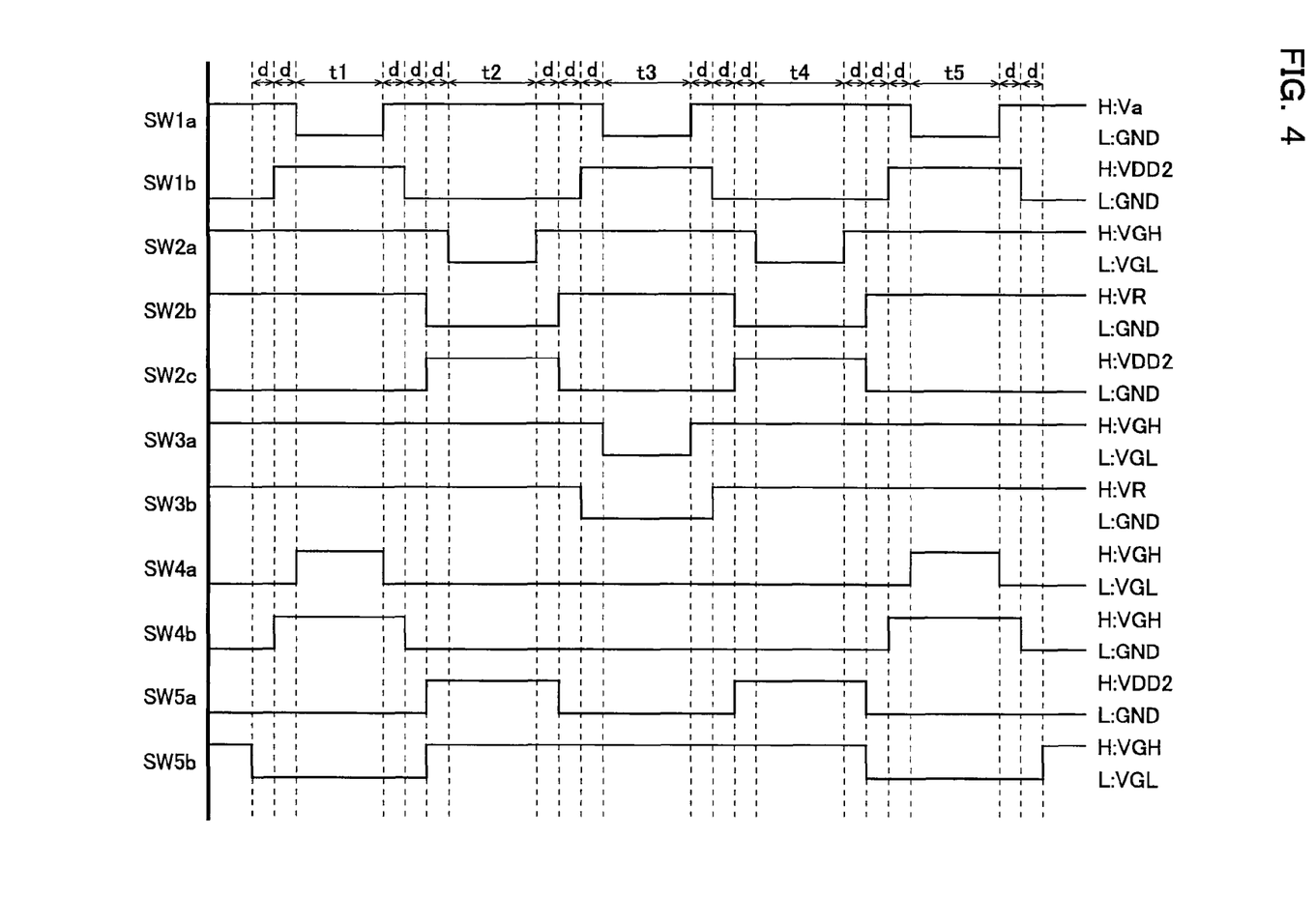
FIG. 4 A timing chart showing a different example of the waveforms of the gate control signals fed to transistors.

The above description deals with a case in which the logic levels of different gate signals are shifted with identical timing; it should, however, be understood that FIG. 3 is a representation meant to make description simple. In practice, as shown in FIG. 4, the logic levels of different gate signals are typically shifted with different timing from one another in order to prevent faults such as a ground short of the input voltage application terminal or the output voltage deriving terminal.

Next, a detailed description will be given of the function of the switches SW5a and SW5b (the function of preventing parasitic operation when a negative voltage is outputted), with reference to FIGS. 5A and 5B as well as FIGS. 1 to 4.

Figure 5A:
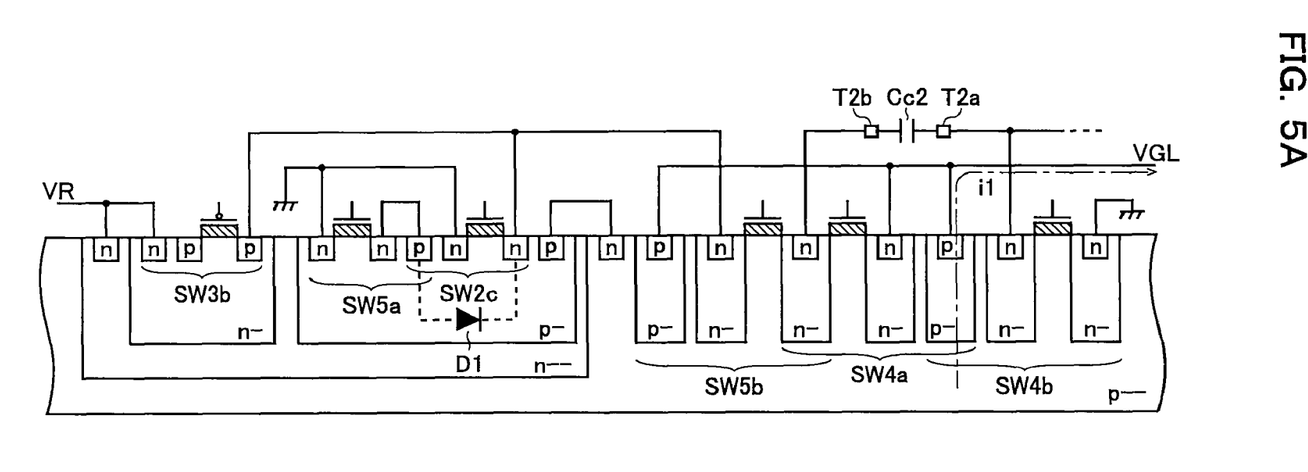
Figure 5B:
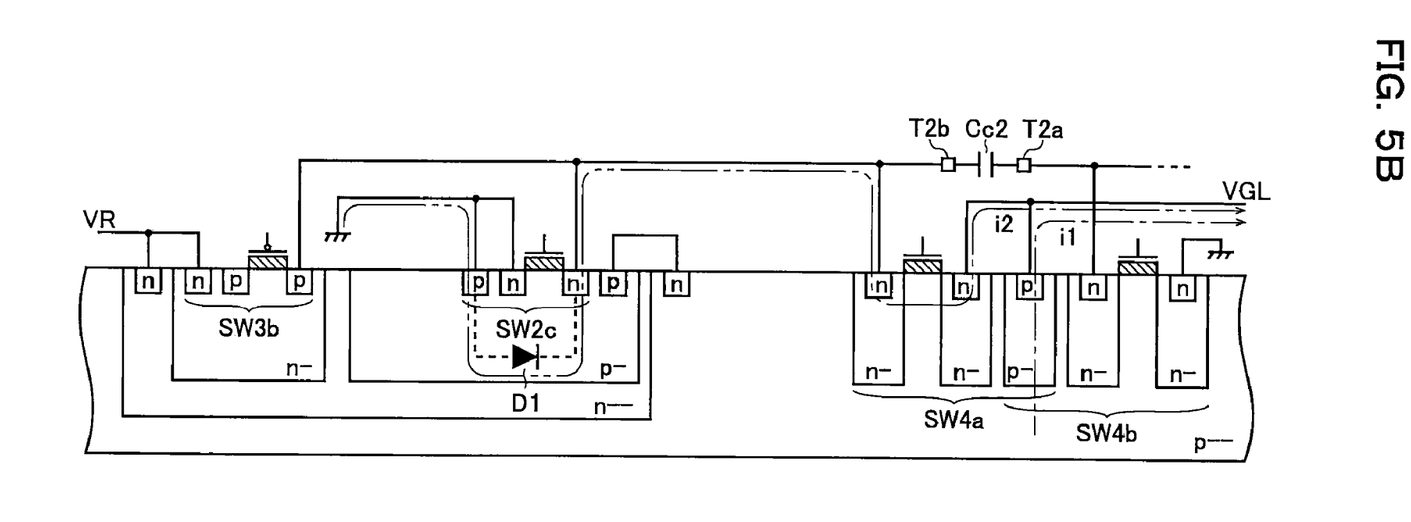

FIGS. 5A and 5B are sectional views showing the vertical structure of the charge pump circuit 31a. FIG. 5A shows a case where the switches SW5a and SW5b are provided, while FIG. 5B shows, for comparison, a case where the switches SW5a and SW5b are not provided.

Typically, when N-channel field effect transistors are used as the switches SW4a and SW4b, the backgate potentials of the transistors need to be lower than the channel potentials of the transistors. To achieve that, in the charge pump circuit 31a of this embodiment, as shown in FIGS. 5A and 5B, a P-type semiconductor substrate is connected to the negative voltage deriving terminal (the external terminal T4), and by extracting a current via a path i1, the backgate potentials of the switches SW4a and SW4b (i.e., the substrate potential) are reduced to the level of the output voltage VGL (−2VR).

Incidentally, in the formation of the charge pump circuit 31a, to make the second end of the step-up capacitor Cc2 (the external terminal T2b) connected to only one of the ground terminal and the negative voltage output terminal, it is only necessary that, as shown in FIG. 5B, the switch SW2c be provided between the external terminal T2b and a ground terminal and the switch SW4a between the external terminal T2b and the negative voltage output terminal.

However, when the configuration shown in FIG. 5B is adopted, the parasitic diode D1 accompanying the switch SW2c is forward biased when the output voltage VGL is outputted, and thus a current is extracted via a path i2 from a ground terminal.

If, as described above, a current is extracted not from the P-type semiconductor substrate but unexpectedly from a ground terminal, the backgate potentials of the switches SW4a and SW4b cannot be reduced, and thus, it may be impossible to obtain the output voltage VGL negatively stepped up to a desired level.

To avoid that, in the charge pump circuit 31a of this embodiment, for the purpose of cutting off the path i2 described above, the switch SW5a is connected between the backgate of the switch SW2c and the ground terminal, and the switch SW5b is connected between, at one end, the drain of the switch SW2c and, at the other end, the second end of the step-up capacitor Cc2, and the drain of the switch SW2c to the drain of the switch SW4a.

The switch SW5a is controlled so as to keep the connection line between the backgate of the switch SW2c and the ground terminal connected only when the step-up capacitor Cc2 is charged, and keep the connection line disconnected otherwise.

The switch SW5b is controlled so as to keep the connection lines leading to the drain of the switch SW2c disconnected only when the negative output voltage VGL is outputted and keep the connection lines connected otherwise.

The switches SW5a and SW5b provided as described above securely cut off the path i2 even if the parasitic diode D1 in the switch SW2c is forward biased when the output voltage VGL is outputted, and thus no current is extracted unexpectedly from a ground terminal.

Thus, in the charge pump circuit 31a of this embodiment, since a current is securely extracted from the P-type semiconductor substrate via the path i1, it is possible to sufficiently reduce the backgate potentials of the switches SW4a and SW4b (i.e., the substrate potential), and thus to obtain the output voltage VGL negatively stepped up securely to a desired level (−2VR).

Next, a detailed description will be given of the variable control of the start-up characteristic (start-up time) in the charge pump circuit 31a with reference to FIGS. 6A and 6B.

Figure 6A:
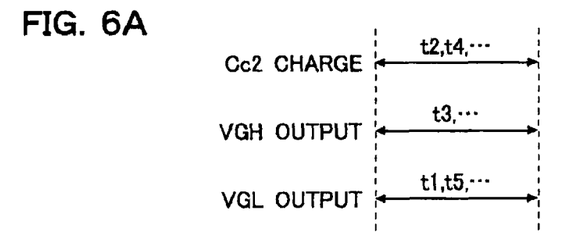
FIG. 6A A diagram showing a relationship among the charge period of a step-up capacitor Cc2 and the output periods of output voltages VGH and VGL.
Figure 6B:
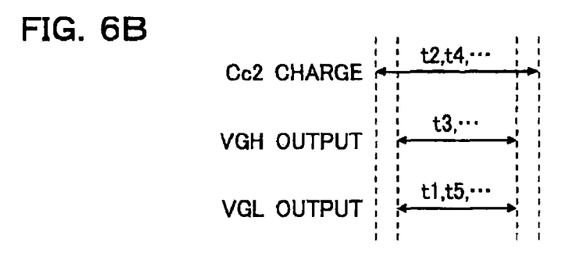
FIG. 6B A diagram showing another relationship among the charge period of step-up capacitor Cc2 and the output periods of the output voltages VGH and VGL.

FIGS. 6A and 6B are diagrams each showing a relationship among the charge period of the step-up capacitor Cc2 and the output periods of the output voltages VGH and VGL.

As shown in the figures, in the charge pump circuit 31a of this embodiment, an unshown control circuit that generates the gate signals for the switches variably controls the ratio of the charge period of the step-up capacitor Cc2 (t2, t4, . . . ) to the output period of the output voltage VGH (t3, . . . ) and the output period of the output voltage VGL (t1, t5, . . . ) according to a predetermined control signal.

As compared with the case shown in FIG. 6A, where the charge period of the step-up capacitor Cc2 and the output periods of the output voltages VGH and VGL have the same length, in the case shown in FIG. 6B where the former period is made shorter than the latter periods, the output voltages VGH and VGL can be made to rise more gently. Although not shown in the figures, a similar variable control may be performed with respect to the ratio between the output periods of the output voltages VGH and VGL.

In contrast to a configuration in which the start-up characteristic is determined by appropriately adjusting the current supply capacity of field effect transistors that are used as switches, the configuration that performs the variable control described permits the start-up characteristic to be adjusted as the user desires according to a predetermined control signal. Thus, demands not only from a user who gives priority to the improvement of start-up speed but also from a user who gives priority to the improvement of stability can be satisfied.

In particular, in the configuration where the outputs of the positive/negative output voltages VGH and VGL are alternately repeated as in the charge pump circuit 31a of this embodiment, it is important to enhance the stability of the start-up characteristic, and thus, it is preferable that the output periods of the output voltages VGH and VGL be set shorter than the charge period of the step-up capacitor Cc2 so as to permit the output voltages VGH and VGL to rise gently.

In the embodiment described above, it is assumed that, as the output voltages VGH and VGL, a voltage having a level of 3VR and a voltage having a level of −2VR are derived, respectively. This, however, is not meant to limit the configuration of the present invention to such a configuration. It should be understood that, with a minor circuit change, such as a change in the number of step-up stages or a change in the position of the output voltage deriving terminal, made in it, the present invention is applicable to charge pump circuits of any other voltage-step-up factors (for example, positive step-up by a factor of 2 combined with negative step-up by a factor of 1, positive step-up by a factor of 4 combined with negative step-up by a factor of 3, etc.).

It should also be understood that the configuration in which the switches SW5a and W5b are arranged so as to prevent a parasitic operation when a negative voltage is outputted also applies in a charge pump circuit capable of outputting only a negative stepped-up voltage, and that the variable control of the ratio between the charge period of the step-up capacitor and the output period of a stepped-up voltage applies in a charge pump circuit which is capable of outputting only either a positive or a negative stepped-up voltage.

The present invention may be carried out in any manner other than specifically described above as embodiments, and permits any variations and modifications made within the spirit thereof.

INDUSTRIAL APPLICABILITY

The present invention is useful for making a charge pump circuit compact, slim, and light. Furthermore, the present invention is useful for enhancing the flexibility of the start-up characteristic of a charge pump circuit. Moreover, the present invention is useful for enhancing the reliability of the negative step-up operation of a charge pump circuit.

What is claimed is:

1. A charge pump circuit comprising:
   a step-up capacitor to be charged and discharged in repeated cycles;
   a charger that, when charging the step-up capacitor, makes a first end of the step-up capacitor conduct to an input voltage application terminal and makes a second end of the step-up capacitor conduct to a ground terminal;
   a discharger that, when a negative voltage is provided as an output, makes the first end of the step-up capacitor conduct to the ground terminal and makes the second end of the step-up capacitor conduct to a negative voltage output terminal; and
   an output capacitor connected to the negative voltage output terminal,
   the charge pump circuit providing a negative voltage as an output from the negative voltage output terminal,
   wherein the charge pump circuit includes, as a component of the charger, a field effect transistor to allow/interrupt conduction between the second end of the step-up capacitor and the ground terminal,
   wherein a first switch is connected between a backgate of the field effect transistor and the ground terminal, the first switch being turned on to allow conduction between the backgate of the field effect transistor and the ground terminal when the step-up capacitor is charged, and the first switch being otherwise turned off to interrupt conduction between the backgate of the field effect transistor and the ground terminal, and
   wherein a second switch is connected to one of a source terminal and a drain terminal of the field effect transistor that is located on the step-up capacitor side, the second switch being turned off to interrupt conduction between the field effect transistor and the step-up capacitor when a negative voltage is provided from the negative voltage output terminal, and the second switch being otherwise turned on to allow conduction between the field effect transistor and the step-up capacitor.

2. An LCD driver IC to control driving of a liquid crystal display, comprising: the charge pump circuit of claim 1 as a drive voltage generator for generating a drive voltage for the liquid crystal display.

3. An electronic appliance comprising: a liquid crystal display as an appliance display; and an LCD driver IC according to claim 2 to control driving of the liquid crystal display.

* * * * *